(12) United States Patent
Schumann

(10) Patent No.: US 7,366,823 B2
(45) Date of Patent: Apr. 29, 2008

(54) METHOD AND SYSTEM FOR MEMORY ACCESS

(75) Inventor: Reinhard Schumann, Exeter, NH (US)

(73) Assignee: Broadcom Corporation, Irvine, CA (US)

( * ) Notice: Subject to any disclaimer, the term of this patent is extended or adjusted under 35 U.S.C. 154(b) by 286 days.

(21) Appl. No.: 11/126,501

(22) Filed: May 11, 2005

(65) Prior Publication Data

US 2006/0259679 A1    Nov. 16, 2006

(51) Int. Cl.
    *G06F 12/00* (2006.01)
(52) U.S. Cl. .................. 711/100; 711/168; 711/105
(58) Field of Classification Search ............... 711/100
    See application file for complete search history.

(56) References Cited

U.S. PATENT DOCUMENTS 4,845,664 A * 7/1989 Aichelmann et al. ....... 711/105
5,598,526 A * 1/1997 Daniel et al. ............... 345/540
6,473,838 B1 * 10/2002 Bass et al. .................. 711/151
2002/0194451 A1 * 12/2002 Mukaida et al. ............ 711/203
2003/0112685 A1 * 6/2003 Duh et al. ................... 365/221
2005/0050375 A1 * 3/2005 Novak et al. ............... 713/600
2006/0203570 A1 * 9/2006 Meier et al. ........... 365/189.05

* cited by examiner

*Primary Examiner*—Pierre Bataille
*Assistant Examiner*—Ryan Dare
(74) *Attorney, Agent, or Firm*—McAndrews Held & Malloy, Ltd.

(57) ABSTRACT

Described herein are a method and system for memory access. As the complexity of digital signal processing applications increases, designs may require multiple memory chips. To optimize the bandwidth of the data being accessed from the memory chips, blocks of data are read alternatively from each memory chip. The size of a block of data is determined by the bit width of a word and the number or memory arrays in a chip.

16 Claims, 3 Drawing Sheets

METHOD AND SYSTEM FOR MEMORY ACCESS

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Dynamic Random Access Memory (DRAM) transfers data, commands and addresses on the rising portion of a clock cycle. A Double Data Rate Dynamic Random Access Memory (DDR-DRAM) is able to transfer information on both the rise and the fall of the clock cycle to double the data rate for the same given clock rate.

DDR2-DRAM is a natural extension of the DDR standard. While DDR-DRAM operate from a 2.5 V power supply, the DDR2-DRAM supply voltage is 1.8 V for the core and the data in/outputs. Therefore, the power consumption at comparable operation frequencies is much lower for DDR2-DRAM, and DDR2-DRAM adds headroom for operation at higher frequencies. Given the benefits of DDR2-DRAM, hardware designs may evolve to replace DDR-DRAM with DDR2-DRAM.

Limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Described herein are system(s) and method(s) for memory access, substantially as shown in and/or described in connection with at least one of the figures, as set forth more completely in the claims.

These and other advantages and novel features of the present invention will be more fully understood from the following description.

DETAILED DESCRIPTION OF THE INVENTION

According to certain aspects of the present invention, a system and method are presented for memory access.

Figure 1:
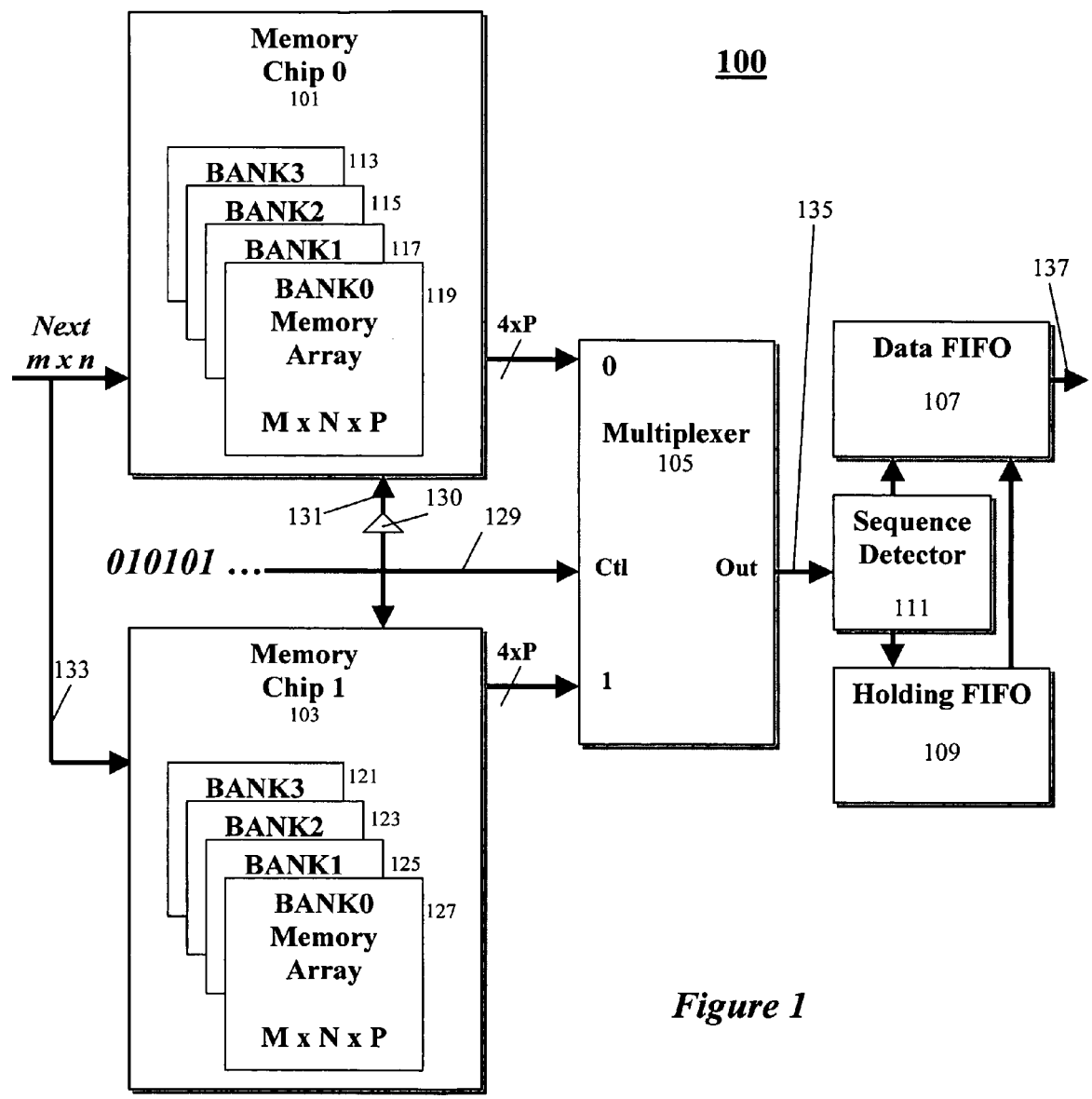
FIG. 1 is a block diagram of an exemplary system for memory access in accordance with an embodiment of the present invention.

FIG. 1 is a block diagram of an exemplary system 100 for memory access in accordance with an embodiment of the present invention. The system comprises two memory chips, chip0 101 and chip1 103, and unaligned multi-byte access circuitry 105, 107, 109, and 111. Although this system is illustrated with two memory chips, a similar system can also be designed using three or more memory chips.

Chip0 101 and chip1 103 can be Double Data Rate Synchronous Dynamic Random Access Memory (DDR-DRAM) or second-generation DDR-DRAM (DDR2-DRAM). The memory chips 101 and 103 can each have four banks of memory arrays. Memory array banks 113, 115, 117, and 119 are in Chip0 101, and memory array banks 121, 123, 125, and 127 are in Chip1 103.

The shortest type of DDR2-DRAM read command specifies a data transfer of four words in two cycles. The read operation transfers an aligned block of 4×P bits, where P is the word width of the memory. For the 16-bit word example, 64 bits (8 bytes) are transferred for each command. When it is necessary to read a block of data that is not aligned, a number of aligned blocks are read to cover the unaligned block. The unneeded bytes at the unaligned end(s) of the transfer are discarded, thus wasting memory bandwidth. The average number of bytes wasted for each unaligned end is proportional to the block size of the aligned blocks. Thus it is beneficial, for the purpose of reducing wasted bandwidth to use a small aligned block size. In designs with two memory chips, operating the two memory chips separately rather than operating them as a pair with a doubled word width can improve bandwidth utilization for unaligned accesses. In the 16-bit example, 8-byte blocks can be accessed alternatively from each of the DDR2-DRAMs 101 and 103, instead of accessing 16-byte blocks from the two DDR2-DRAMs in parallel.

A sequence of data is stored as interleaved 8-byte blocks. The access circuitry 105, 107, 109, and 111 deinterleaves the accessed data for further processing. The separate control of the two memory chips 101 and 103 can be accomplished using a shared address 133 and a shared control bus 129. The shared address 133 advances to index the next 8-byte block to be read in a selected chip. The shared control bus 129 issues read commands to chip0 101 and chip1 103 on alternating cycles. For some sequences of 8-byte blocks, the accesses do not alternate between the two memory chips. In this case, the read commands issued will alternate between chips, but they may be out of order with respect to the original request sequence.

A multiplexer 105 can be controlled with a chip select input 129 synchronized to the read command sequence {0101 . . . } 129 for chip1 103. When chip1 103 is read, the multiplexer 105 selects the output of chip1, and when chip1 103 is not read, the multiplexer 105 selects the output of chip0. A sequence detector 111 will send the block of data 135 to a data fifo (i.e. first-input-first-output buffer) 107 if it is the next one in the original request sequence. If the block of data 135 is not the next one of the original request sequence it is placed in a holding fifo 109, which may be a double buffer. Once the intervening data from the other memory chip has been sent to the data fifo, the holding fifo 109 passes the block of data to the data fifo 137.

Since each of the two memory chips receive a read command on every second cycle and the requests are issued in alternate cycles, the read commands can be sent over a common control bus. A separate chip select signal is provided for each memory chip to determine which memory chip will receive the command during each.

Write data sequences can be interleaved in a similar manner with a similar bandwidth reduction benefit.

Four (or three) memory chips may be interleaved in a similar manner, to provide additional bandwidth. In this case, the clocks to two (one) of the memory chips can be operated on the opposite phase and the command bus can be operated in a dual data rate manner similar to the data bus so that two commands can be issued per cycle.

Figure 2:
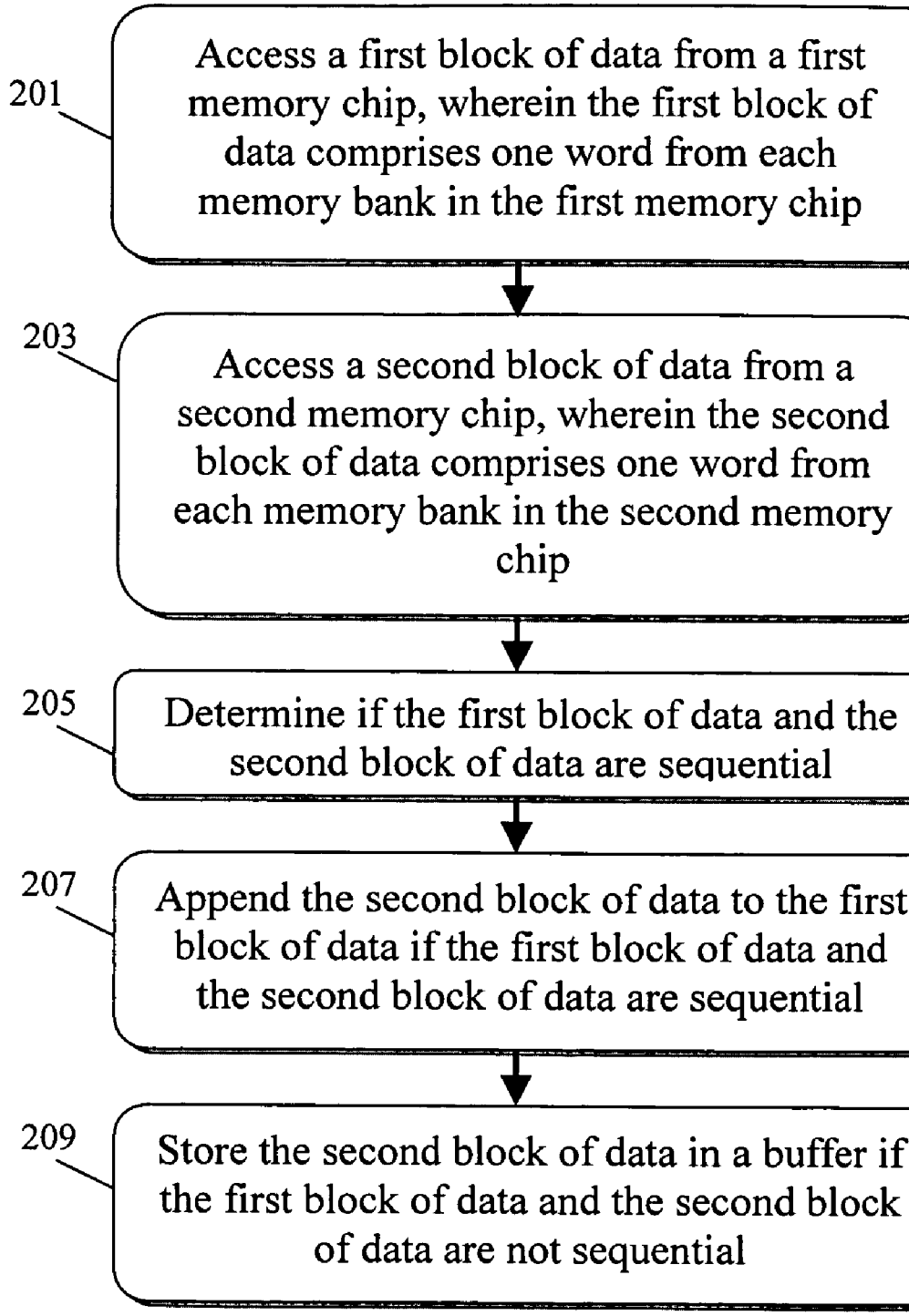
FIG. 2 is a flow diagram of an exemplary method for memory access in accordance with an embodiment of the present invention.

FIG. 2 is a flow diagram 200 of an exemplary method for memory access in accordance with an embodiment of the present invention. At 201, a first block of data is accessed from a first memory chip, wherein the first block of data comprises one word from each memory bank in the first memory chip. At 203, a second block of data is accessed from a second memory chip, wherein the second block of data comprises one word from each memory bank in the second memory chip. The size of the word can be a power of 2 (i.e. $2^N$ where N=1,2,3 . . . ). DDR-DRAM and DDR2-DRAM commonly have 8-bit, 16-bit, 32-bit, or 64-bit words and four memory banks.

At 205, it is determined whether the first block of data and the second block of data are sequential. At 207, the second block of data is appended to the first block of data if the first block of data and the second block of data are sequential. At 209, the second block of data is stored in a buffer if the first block of data and the second block of data are not sequential. When the current data sequence has been processed, the buffered block of data becomes the start of the next sequence.

Figure 3:
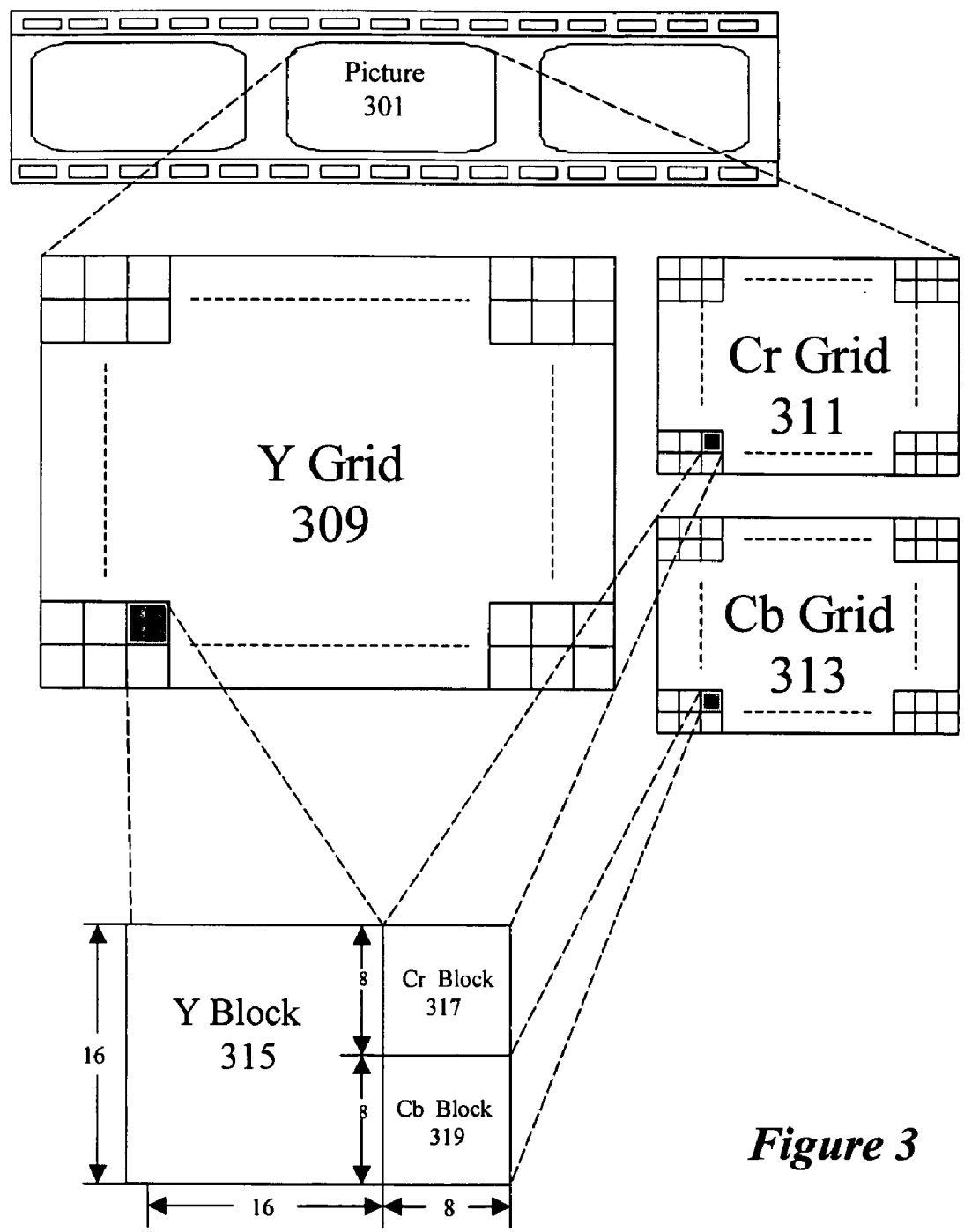
FIG. 3 is a block diagram of an exemplary picture in accordance with an embodiment of the present invention.

In FIG. 3 there is illustrated a diagram of an exemplary digital picture 301. The digital picture 301 comprises two-dimensional grid(s) of pixels. For color video, each color component is associated with a unique two-dimensional grid of pixels. For example, a picture can include luma, chroma red, and chroma blue components. Accordingly, these components can be associated with a luma grid 309, a chroma red grid 311, and a chroma blue grid 313. When the grids 309, 311, 313 are overlaid on a display device, the result is a picture of the field of view at the duration that the picture was captured.

Generally, the human eye is more perceptive to the luma characteristics of video, compared to the chroma red and chroma blue characteristics. Accordingly, there are more pixels in the luma grid 309 compared to the chroma red grid 311 and the chroma blue grid 313.

The luma grid 309 can be divided into 16×16 pixel blocks. For a luma block 315, there is a corresponding 8×8 chroma u block 317 in the chroma u grid 311 and a corresponding 8×8 chroma v block 319 in the chroma v grid 313. Blocks 315, 317, and 319 are collectively known as a macroblock.

In some applications, the macroblock data is referred to as frame data, and consists of alternating rows of field data, to be displayed at alternating scan times interlaced manner.

To ensure that bandwidth is shared equally between the two rams for accesses to arbitrary rectangular groups of pixels within the macroblock, the assignment of 8-byte pixel data blocks to memory chips can be alternated at every row, or every second row. If the assignment is alternated at every second row, the bandwidth will also be shared equally for accesses to rectangular groups of field data pixels for either field. For a given address, the first memory chip can be accessed prior to the second memory chip for a first period of time, and then, the first memory chip can be accessed after the second memory chip for a second period of time. Optimizing the bandwidth as described in reference to FIG. 1 and FIG. 2 allows efficient memory access for these video applications.

The degree of integration of the memory access circuit will primarily be determined by the speed and cost considerations. Because of the sophisticated nature of modern processors, it is possible to utilize a commercially available DRAM, which may be implemented external to an ASIC implementation.

If the memory is available as an ASIC core or logic block, then the commercially available memory can be implemented as part of an ASIC device wherein certain functions can be implemented in firmware as instructions stored in a memory. Alternatively, the functions can be implemented as hardware accelerator units controlled by the processor.

While the present invention has been described with reference to certain embodiments, it will be understood by those skilled in the art that various changes may be made and equivalents may be substituted without departing from the scope of the present invention.

Additionally, many modifications may be made to adapt a particular situation or material to the teachings of the present invention without departing from its scope. For example, although the invention has been described with reference to video applications, the invention can be applied to a wide variety of applications.

Therefore, it is intended that the present invention not be limited to the particular embodiment disclosed, but that the present invention will include all embodiments falling within the scope of the appended claims.

The invention claimed is:

1. A method for memory access, said method comprising:
   accessing a first block of data from a first memory chip, wherein the first block of data comprises one word from each memory bank in the first memory chip;
   accessing a second block of data from a second memory chip, wherein the second block of data comprises one word from each memory bank in the second memory chip;
   determining if the first block of data and the second block of data are sequential;
   if the first block of data and the second block of data are sequential, appending the second block of data to the first block of data; and
   if the first block of data and the second block of data are not sequential,
      storing the second block of data in a buffer;
      accessing a third block of data from the first memory chip;
      appending the third block of data to the first block of data; and
      appending the second block of data to the third block of data.

2. The method of claim 1, wherein the words in the memory banks are 16 bits.

3. The method of claim 1, wherein the words in the memory banks are 32 bits.

4. The method of claim 1, wherein the words in the memory banks are 48 bits.

5. The method of claim 1, wherein the words in the memory banks are 64 bits.

6. The method of claim 1, wherein the first memory chip and the second memory chip each comprise four memory banks.

7. The method of claim 1, wherein the method further comprises commanding the first memory chip and the second memory chip to be accessed on alternating cycles.

8. The method of claim 1, wherein the first memory chip is accessed prior to the second memory chip for a first period of time, and wherein the first memory chip is accessed after the second memory chip for a second period of time.

9. A system for memory access, said method comprising:
a first memory chip having a first plurality of memory banks, wherein one word in a first block of data is stored in each memory bank in the first plurality of memory banks;
a second memory chip having a second plurality of memory banks, wherein one word in a second block of data is stored in each memory bank in the first plurality of memory banks;
a first circuit for accessing the first block of data and the second block of data;
a first buffer for receiving the first block of data and the second block of data if the first block of data and the second block of data are sequential; and
a second buffer for storing the second block of data, while the first circuit accesses a third block of data from the first memory chip, if the first block of data and the second block of data are not sequential.

10. The system of claim 9, wherein the words in the memory banks are 16 bits.

11. The system of claim 9, wherein the words in the memory banks are 32 bits.

12. The system of claim 9, wherein the words in the memory banks are 48 bits.

13. The system of claim 9, wherein the words in the memory banks are 64 bits.

14. The system of claim 9, wherein the first memory chip and the second memory chip each comprise four memory banks.

15. The system of claim 9, wherein the system further comprises a command bus for commanding the first memory chip and the second memory chip to be accessed on alternating cycles.

16. The system of claim 15, wherein the command bus commands the first memory chip to be accessed prior to the second memory chip for a first period of time, and wherein the command bus further commands the first memory chip to be accessed after the second memory chip for a second period of time.

* * * * *